No. 706,401. Patented Aug. 5, 1902.
L. S. FLECKENSTEIN.
COMBINED CORN COOKING AND CANNING MACHINE.
(Application filed Dec. 4, 1901.)
(No Model.) 3 Sheets—Sheet 1.
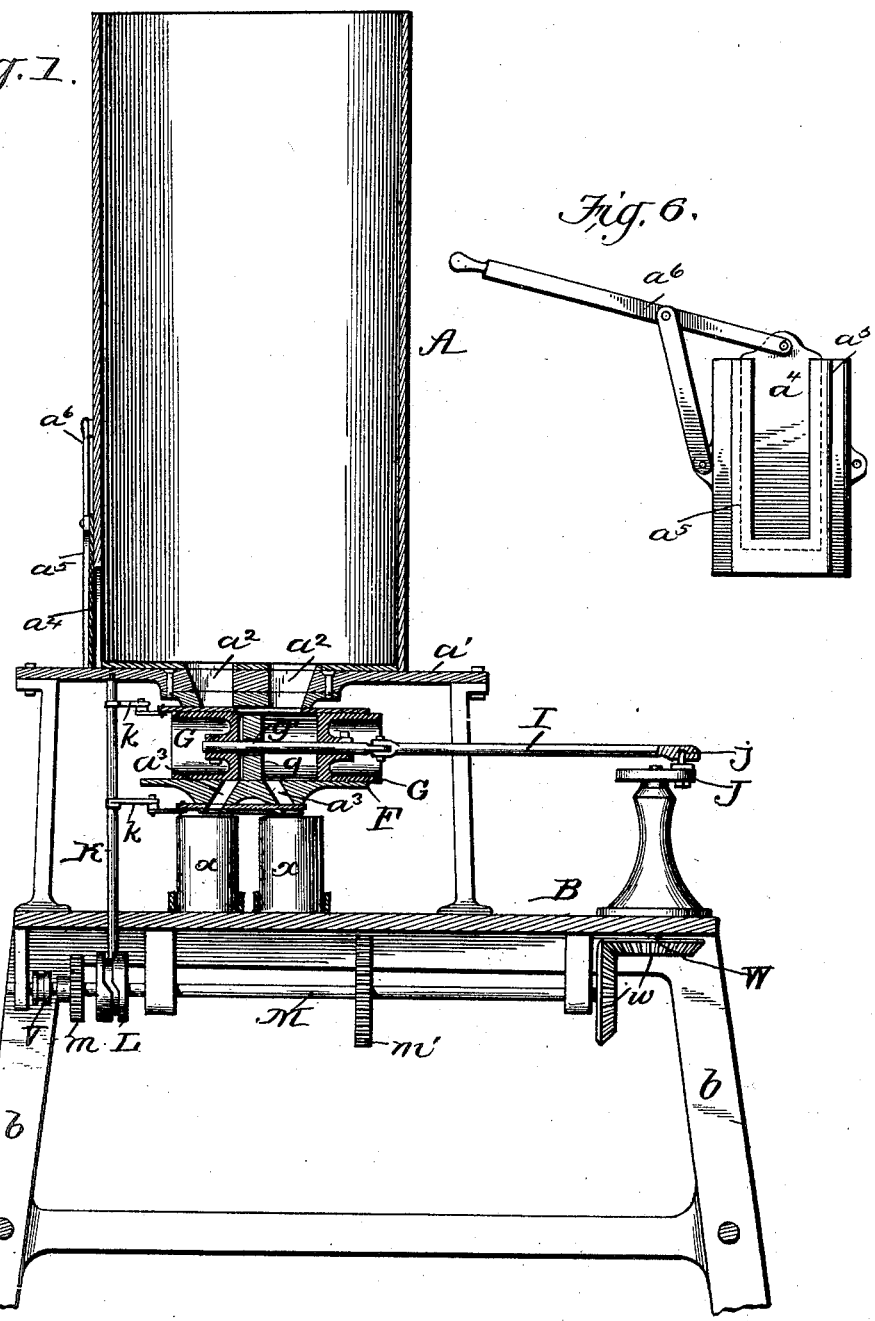
WITNESSES:
Jas. A. Ryan
Henry Rockwell
INVENTOR
L. S. Fleckenstein
BY Munn & Co.
ATTORNEYS

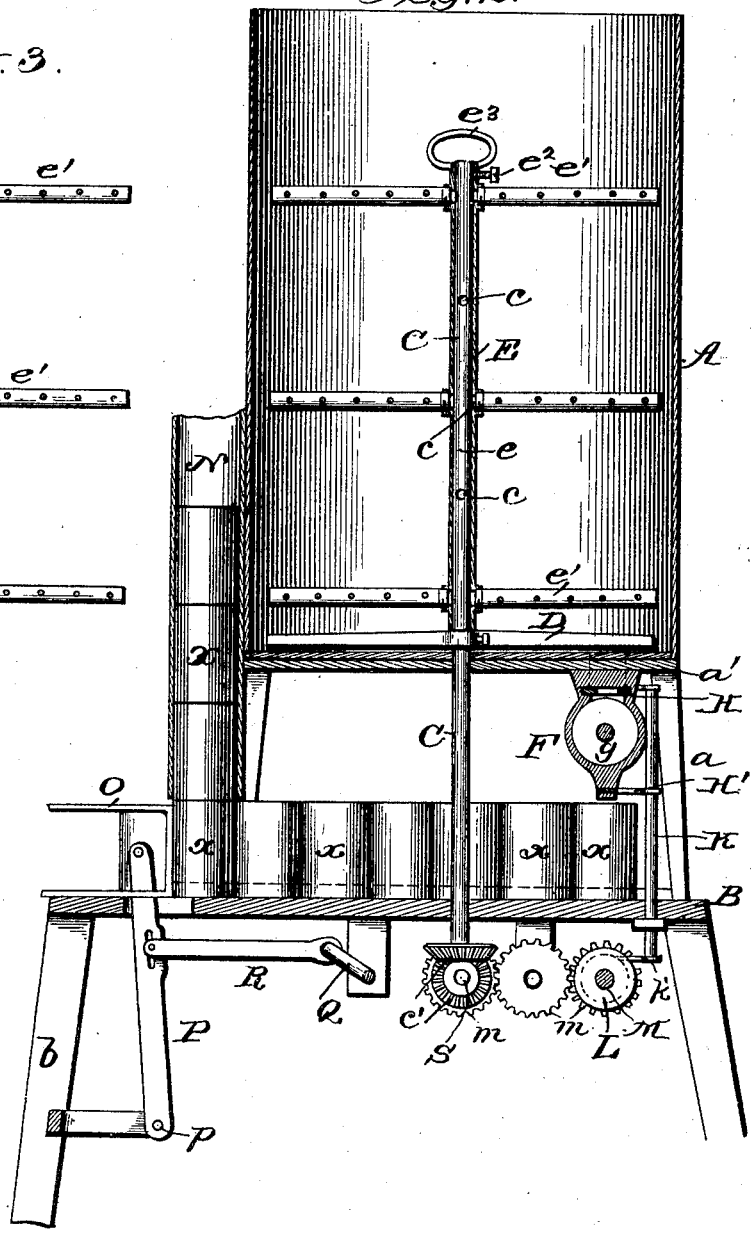
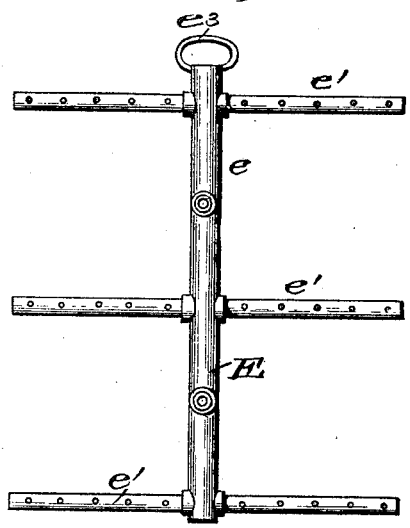

No. 706,401. Patented Aug. 5, 1902.
L. S. FLECKENSTEIN.
COMBINED CORN COOKING AND CANNING MACHINE.
(Application filed Dec. 4, 1901.)

(No Model.) 3 Sheets—Sheet 3.

WITNESSES:
Jno. G. Ryan
Henry Rockwell

INVENTOR
L. S. Fleckenstein
BY Munn & Co,
ATTORNEYS

UNITED STATES PATENT OFFICE.

LEONARD S. FLECKENSTEIN, OF EASTON, MARYLAND.

COMBINED CORN COOKING AND CANNING MACHINE.

SPECIFICATION forming part of Letters Patent No. 706,401, dated August 5, 1902.

Application filed December 4, 1901. Serial No. 84,664. (No model.)

*To all whom it may concern:*

Be it known that I, LEONARD S. FLECKENSTEIN, a citizen of the United States, residing at Easton, in the county of Talbot and State of Maryland, have made certain new and useful Improvements in a Combined Corn Cooking and Canning Machine, of which the following is a specification.

It is the object of my invention to produce an improved automatic corn cooking and canning machine which shall be distinguished by simplicity of construction, economy of manufacture, and ease and efficiency of operation.

The details of construction, arrangement, and operation of parts are as hereinafter described, reference being had to the accompanying drawings, in which—

Figure 4:
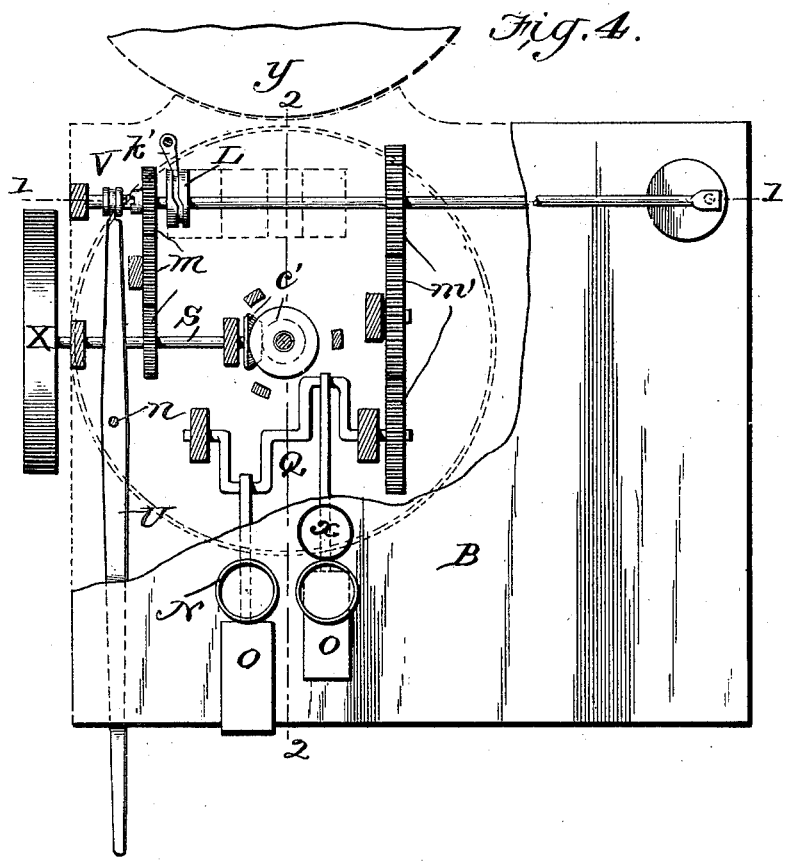
Figure 5:
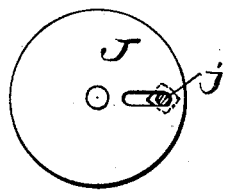

Figure 1 is a vertical section of the machine on the line 1 1 of Fig. 4. Fig. 2 is another vertical section on the line 2 2 of Fig. 4. Fig. 3 is a side view of the detachable device employed for conducting steam into the corn and agitating the same. Fig. 4 is a plan view of the lower portion of the machine, a part of the platform being broken away. Fig. 5 is a detail view illustrating the detachable connection of a pitman with a crank. Fig. 6 is a detail view of a sliding gate for the cooker.

Referring in the first instance to Figs. 1 and 2, A indicates a vertical cylinder into which the corn to be cooked and canned is placed. The same is supported rigidly by legs $a$ upon a horizontal platform B, which is in turn supported by strong rigid framework $b$. Between such cylinder A and the platform or table B is arranged the mechanism for charging the cans $x$, which are automatically and intermittently pushed along over the platform, as hereinafter described. A vertical hollow shaft C projects through the bottom of the fixed cylinder A in the center thereof and carries a scraper D and a device E, which combines the functions of a steam-discharger and corn-agitator. The same is constructed of a central tube $e$, which is adapted to slide upon the shaft C, and a series of hollow radial arms $e'$. Steam is introduced into the lower end of the hollow shaft C and enters the arms $e'$ of the device E through holes $c$, which register with said arms, as shown. The latter are in turn provided with lateral openings through which the steam is discharged into the corn. The device E is secured to the shaft C in the required position by means of a clamp-screw $e^2$. It will be understood that any other preferred fastening may be employed. By this means it is apparent that when the shaft C is rotated the device E will have the same motion and that the arms $e'$ will pass through the body of corn contained within the cylinder A, while steam will be at the same time discharged from the arms, so as to thoroughly cook the corn.

It is requisite that the corn-agitator E shall be cleaned at the end of each day's work, and it is an important feature of my invention that for this purpose I have adapted it to be readily detached. This operation is effected by simply loosening the clamp-screw $e^2$ and raising the device E vertically by means of its handle $e^3$. It may then be placed in a water-tank and thoroughly cleaned. Thus much labor and trouble incident to corn-cooking in which the stirring or agitating device is fixed to its shaft are avoided and greater cleanliness is obtained.

Below the cylinder A and its platform-support $a'$ is located the can-charging apparatus proper. The same consists of a casting F, having a cylindrical bore arranged horizontally, two pistons G, and two valves H and H'. The casting F is provided with openings at the top which register with passages $a^2$, leading down from the cylinder A, and on the under side it is similarly provided with two discharge-passages $a^3$. In the center of the bore is arranged a transverse partition $g$. Trunk-pistons G are arranged on opposite sides of this partition $g$ and connected by a rod $g'$, which passes through the latter. Said rod $g'$ is connected by a pitman I with a crank arm or disk J. The pistons G are so arranged and operated that when one is ejecting corn from one side of the chamber the other is opening to allow space for the introduction of the corn into the chamber on the other side of the partition $g$. In other words, when corn is filling the chamber on one side it is being discharged on the other. To enable this to be done, it is obvious that the valves H and H' must operate oppositely—that is to say, in such manner as to close one of the inlet-passages $a^2$ when the corresponding discharge-passage $a^3$ is open, and vice versa. Thus, as shown in Fig. 1, the left-hand inlet-passage $a^2$ is closed and the corresponding passage $a^3$ below the same is open and the right-hand inlet passage $a^2$ is open while the corresponding discharge-passage $a^3$ is closed. The valves H and H' are slidable plates, each provided with a slot so arranged as to open and cut off inlet and discharge passages alternately. It will be understood that the valves H H' are reciprocated simultaneously but intermittently, the dwell or period of rest being such as required for the pistons G to make a complete movement in one direction, whereby a can $x$ is charged. To effect this movement of the valves, they are connected with the radial arms $k$ of a vertical rock-shaft K, (see Figs. 1 and 4,) which is provided at its lower end with an arm $k'$, whose free end works in the circumferential groove of a circular cam L, mounted upon a counter-shaft M. The groove of the cam has an abrupt offset, so that a sudden rotary movement is imparted to the shaft K once in each rotation of said cam, and thereby a correspondingly sudden movement of the valves H H' is effected, so as to cut off inlet and discharge of corn practically instantaneously. The parts are so arranged that this intermittent reciprocation of the valves H H' occurs just preceding each reciprocating movement of the pistons G G. It will be understood that the movement of the latter is continuous and that a can is charged with each movement of the same inward or outward. In practice the connecting-rod I will be so attached to the pistons that the parts may be easily disconnected for the purpose of cleaning the apparatus and, further, that the valves H H' will also be detachably connected with the shaft K for the same purpose.

The cans $x$, which are to be charged, are received upon the platform B through a vertical passage or chute N. (See Fig. 2.) Thus a series of cans rest one upon another endwise, as shown, and for the purpose of moving them laterally upon the platform a distance the width of the diameter of a can I employ the pusher O, which is a device adapted to slide upon the platform. (See Fig. 2.) It is reciprocated as required by means of a vertical lever P, which is pivoted at $p$ to the rigid base-frame $b$ and is vibrated by a crank-shaft Q, with which it is connected by a bar or rod R. There are in practice two chutes or can-passages N and two can-pushers O, with corresponding actuating mechanism. (See Fig. 4.) As before intimated, the throw of the lever P is such that traverse of the pusher O is exactly the diameter of a can, and the cans $x$ being arranged to slide between parallel horizontal guides it is apparent that a can will be brought beneath a discharge-opening of the charging apparatus with each inward movement of said lever P. As shown in Fig. 2, the pusher O has an extended top portion which as the same is moved inward for propelling the cans on the platform B comes under the series of cans remaining in the chutes N and supports them during its reciprocation; but when the pusher O makes its backward movement it passes from beneath such series of cans, so that they fall the distance of the length of a can, thus placing the lowest can of the series upon the platform in readiness to be acted upon by the pusher. It is apparent from the previous description of the can-charging operation that the latter is effected alternately—that is to say, that one can is filled at a time. In correspondence with this the cranks of the shaft Q are set directly opposite each other, so that the pushers O, with which said cranks are connected, move alternately in opposite directions simultaneously. Thus one row of cans is pushed forward while the other is at rest. The cans pass completely across the platform or table B and in so doing come beneath the charging apparatus F and are forced upon a rotating table $y$, (see Fig. 4,) which is shown by dotted lines.

I will now describe more in detail the mechanism for effecting the several operations of the shafts and other parts above referred to.

A drive-shaft S (see Fig. 4) is arranged horizontally in suitable bearings beneath the platform B and provided with a band-wheel X. The vertical shaft C, carrying the corn-agitator, is rotated directly from the drive-shaft S by means of beveled gearing $c'$. The counter-shaft M is operatively connected with the drive-shaft S by means of gearing $m$, one of which is an idler. The shaft M is also operatively connected with the double crank-shaft Q by means of a train of gears $m$, one of which is an idler. The crank-disk J is mounted upon a shaft W, which is operatively connected with the counter-shaft M by beveled gearing $w$. For the purpose of throwing the machine into and out of action I employ a lever U, which is pivoted at $n$ to the under side of the platform B and serves to operate a sliding clutch V, which is mounted upon a feathered or splined portion of the shaft M and is adapted to engage a corresponding clutch on one of the train of gears $m$. Thus by moving the lever U in one direction or the other the clutch V may be thrown into or out of engagement with the train of gears $m$, whereby the shaft M will be rotated or left at rest correspondingly.

In case of a difference in the diameter of the cans $x$ the throw of the lever P, by which the pusher O is operated, requires to be changed, and for this purpose the rod R, which connects the lever with the crank-shaft Q, is adapted to be adjusted higher or lower on said lever, as shown in Fig. 2.

In order to enable the throw of the pistons G to be varied as may be required, the wrist-pin $j$, by which the rod I is connected with the crank-disk J, may be shifted in position readily, as illustrated in Fig. 5.

The operation of the machine as a whole, briefly recapitulated, is as follows: The cylinder A being filled with corn which is to be cooked and canned and the machine being put in operation by due shifting of the hand-lever U, the shaft C will be rotated and with it the agitator and steam-discharger E. During the time that the corn is being cooked the pistons G may be left at rest by detaching the wrist-pin $j$ from connection with the rod I. When the corn has been duly cooked and the rod I again connected with the wrist-pin, the corn will fill the chambers in the casting F alternately and be alternately discharged therefrom by the pistons, it being understood that the valves H and H' will be operated simultaneously and intermittently with great suddenness, so as to alternately cut off and open inlet and discharge openings of the respective chambers in said casting. Thus a can $x$ will be filled at each sliding movement of the pistons. Simultaneously with the above charging operation one of the corn-pushers O will be operated to force a row of cans across the platform B the distance of the diameter of a can, and when the pistons again make another movement in the opposite direction this pusher will be retracted, and the other pusher will operate in the same manner to propel another line of cans across the platform. Thus the two lines or rows of cans progress stepwise across the platform alternately the distance of the diameter of a can and in so doing rest under the charger the required length of time to allow them to be duly filled.

In Fig. 6 I show a vertically-slidable gate $a^4$, which is applied to cover an opening in the lower portion of the cylinder or corn-receiver A. This gate slides in vertical guides $a^5$ and is operated by a pivoted hand-lever $a^6$, as shown. By opening the gate access may be conveniently had to the receptacle A for removing corn when required, also for cleaning the receptacle and removing obstructions to the operation of the agitator therein. The provision of such opening and the gate therefor is a matter of much practical importance in the operation of corn-cookers of this class, since with the usual construction of cylinder or corn-receptacle it is very difficult to obtain access to the lower portion of the same, and yet such access is often required. By the provision of the opening and gate the corn therein may be allowed to run out, and the operator may then inspect the interior of the cylinder and easily remove any foreign substance or article that may have been accidentally introduced along with the corn. The corn being ordinarily at a temperature of about 180°, it is manifestly necessary that it shall be let out of the cylinder in order to enable investigation to be made as to the cause of obstruction, &c. By means of the opening and gate therefor I effect a great economy of time in the operation of the apparatus. The lever may be fulcrumed on either side of the guide-frame, as the position of the apparatus may require.

Having thus described my invention, what I claim as new, and desire to secure by Letters Patent, is—

1. In a corn cooking and canning machine, the combination with the vertical corn-receiver, and the hollow, apertured, vertical shaft, supported in the lower portion of the machine and projecting upward and terminating freely in said receiver and means for rotating said shaft, of the agitator formed of a central apertured tube, and lateral hollow arms having apertures for discharging steam, the said agitator being supported on the shaft and adapted to be drawn upward and removed from both the shaft and receiver, as required for cleaning it, as shown and described.

2. In a machine of the character described, the combination, with a corn-receiver, of a casting secured to the under side of the same and having a transverse bore provided with a central partition, two connected pistons arranged to reciprocate in the two chambers formed on opposite sides of said partition, two inlet and two discharge passages arranged vertically opposite each other in the upper and lower sides, respectively, of the casting, the two discharge-passages opening adjacent to the partition and diverging therefrom downward, and two slidable valves provided with slots arranged as described, and means for operating said pistons and valves, whereby the pistons are continuously reciprocated, and the valves are intermittently reciprocated, as required for closing and opening coincident inlet and discharge openings, simultaneously, substantially as shown and described.

3. In a machine of the character described, the combination, with a corn-receiver, having two discharge-passages, two chambers communicating with such passages and having discharge-passages as specified, a central partition dividing the two chambers from each other, two pistons and a rod connecting the same and passing through said partition, the pistons being separated a distance sufficient to admit a can charge between each of them and the partition; means for imparting continuous reciprocation to the pistons; and two valves slotted as described, and arranged in guideways above and below the pistons; a rock-shaft connected with said valves, and a rotatable cam having an abrupt offset with which an arm of the said rock-shaft engages, substantially as shown and described, whereby the valves are moved suddenly and simultaneously immediately preceding a return movement of the pistons, thereby alternately cutting off an inlet and closing a discharge passage of the respective chambers, as specified.

LEONARD S. FLECKENSTEIN.

Witnesses:
WM. G. DENNY,
J. FLETCHER CLARK.